United States Patent Office 3,530,379
Patented Sept. 22, 1970

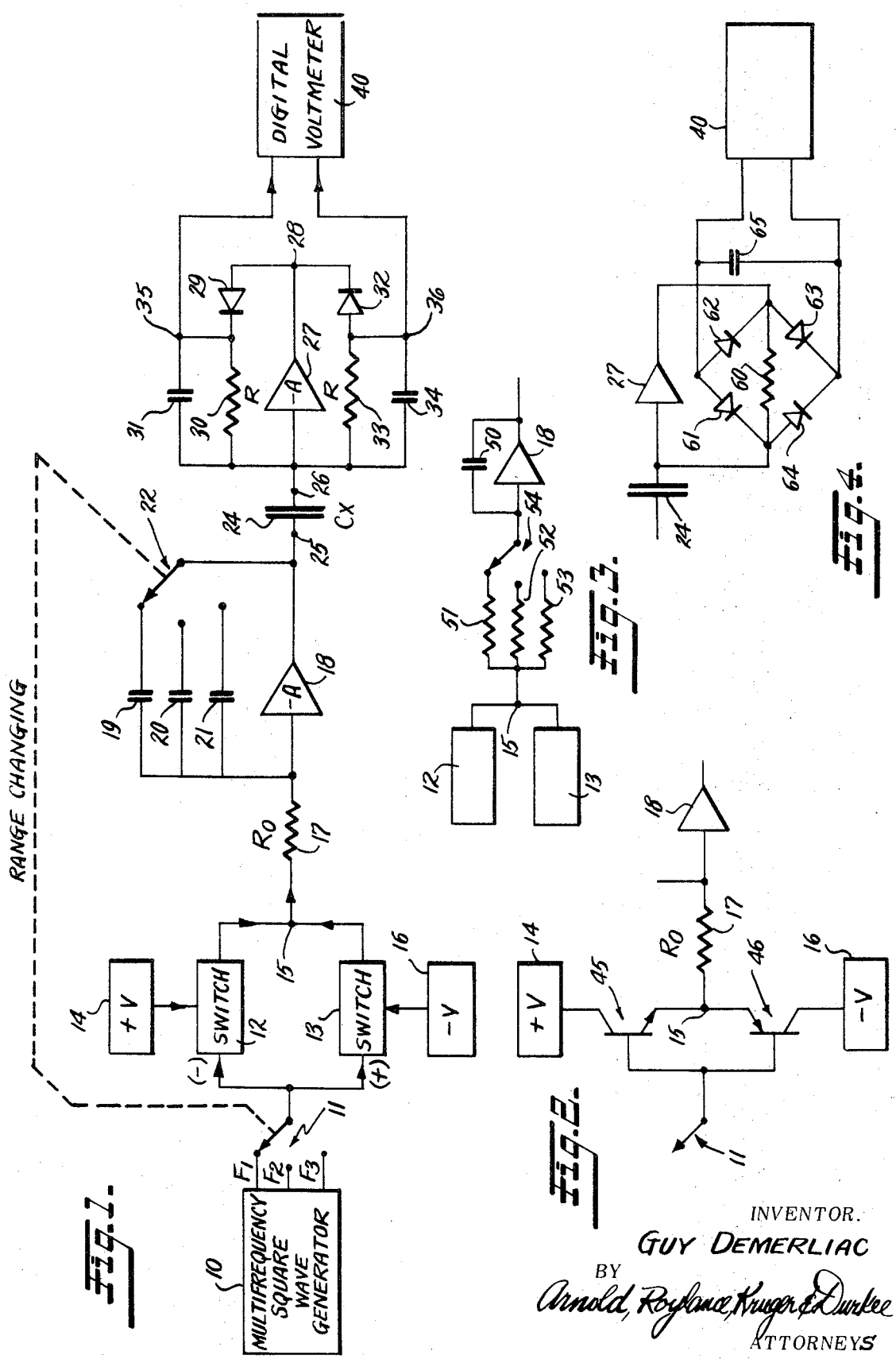

3,530,379
CAPACITANCE MEASURING APPARATUS UTILIZING VOLTAGE RAMPS OF PREDETERMINED SLOPE
Guy Demerliac, Boulogne, France, assignor to Societe d'Instrumentation Schlumberger, Paris, France, a corporation of France
Filed Apr. 11, 1968, Ser. No. 720,651
Claims priority, application France, Apr. 13, 1967, 102,637
Int. Cl. C01r *11/52, 27/26*
U.S. Cl. 324—60
8 Claims

ABSTRACT OF THE DISCLOSURE

Capacitance measuring apparatus in which ramps of precisely known slope are provided to a differentiating circuit in which the unknown capacitor is the input element. The differentiated output is rectified and applied to a meter. The ramps are produced by using a square wave to switch an integrator input between two equal and opposite polarity precise voltage sources. The integrator provides the ramps. Selectable capacitors in the integrator match selectable frequencies or repetition rates from the square wave source, the selector switches being ganged together to provide range switching. The differentiator output is rectified and then measured and displayed by a meter, e.g., a digital voltmeter.

---

This invention relates to an apparatus for measuring capacitance, and, more specifically, to an apparatus for automatically measuring the capacitance of a circuit element and for displaying the resulting measurement.

A conventional manner of measuring the value of a capacitor in the past has been to insert the capacitor in a bridge circuit in which fixed capacitors and, in some cases, other circuit elements are provided, the bridge also usually incorporating at least one variable capacitor. The measurement was based on a comparison, either by reading a meter indicating the unbalance in the bridge or, more often, by adjusting one of the capacitors in the bridge until a balanced condition was reached and then reading the desired measurement from a calibrated knob. A comparison bridge generally operates from a fixed frequency sine wave source.

The above comparative methods are capable of giving quite accurate results. However, it is necessary to make a delicate and careful adjustment for each measurement. The process is therefore quite slow and the final accuracy of the measurement depends in great part on the care taken by the operator. Bridges with automatic adjustment means have been developed but, because of their complexity, have been quite expensive.

The development of digital measuring and displaying devices incorporating, for example, indicators of the type known as Nixie indicators has led to efforts to develop a capacitor measuring circuit which can be easily associated with devices already existing for the numerical measurement of voltages, currents or resistances. Generally speaking, in numerical or digital measuring units the measuring device is basically a voltmeter adapted to measure standard DC voltages ranging, for example, between one millivolt and two volts. Additional circuits are therefore necessary to transform the input magnitudes which are not within this range into usable voltage. This is especially the case for AC voltages. It is, of course, the same when a capacitor is being measured.

Several elementary circuits are known which can deliver a voltage proportional to the value of a capacitor incorporated within the circuit when the circuit is supplied with a cyclic signal. One such circuit is an active differentiator circuit which includes an operational amplifier having an input capacitor and a resistor connected in parallel with the amplifier for negative feedback. When a basic differentiator circuit having an input capacitor of value C and a feedback resistor having a value R is supplied with an input signal having a sinusoidal waveform and having a frequency F and an amplitude A, the output signal $V_o$ is equal to the product AFRC. Assuming that the capacitor C is the element to be measured, and assuming further that the apparatus has been suitably calibrated, it is possible in theory to construct a device of this type, to rectify and filter the output signal $V_o$ and to apply the resulting direct current to a conventional voltmeter, either an analog or digital type, although the digital type is much more advantageous.

In practice, however, the suggested method leads to several difficulties. As can be seen from the above product equated with $V_o$, the accuracy of the measurement is directly determined by the accuracy and stability of A, F, and R. If it is desired to have an accuracy of such measurement of $5 \times 10^{-4}$, each of the above quantities must individually have an accuracy on the order of $10^{-4}$. It is possible to obtain resistors with the required accuracy at a reasonable price, and the digital voltmeters available to measure the resulting output are certainly capable of measurement to this accuracy. However, to obtain a sine wave having suitable accuracy, freedom from distortion, and frequency and amplitude stability greater than $10^{-4}$ requires a relatively expensive device. This is especially true when the generator must be a multi-frequency generator to allow measurement over a wide range. The concept of using a sinusoidal signal to measure capacitor value must therefore be rejected.

An object of the present invention is to provide an apparatus for quickly and automatically providing an indication of capacitor value.

Another object of the invention is to provide an apparatus for measuring capacitors in which a differentiator type circuit is used and in which the accuracy of the measurement is not dependent upon the accuracy of an activating alternating current supply.

Another object is to provide a capacitance measuring apparatus in which the capacitor to be measured is supplied with a ramp function having a precisely defined slope, the frequency and amplitude of the ramp being approximately known.

A further object is to provide a relatively inexpensive and reliable capacitor measuring apparatus having a digital display.

Yet another object of the invention is to provide an apparatus in which a signal generator which supplies the measuring apparatus is a square wave generator which is used to alternately trigger two calibrated direct current forces of opposite size and, preferably, of equal absolute value.

Yet another object is to provide an apparatus for measuring capacitors of various sizes, incorporating range changing switches which provide substantially equal accuracy in all ranges.

Broadly described, the invention includes a source of square waves of at least one frequency, the square wave signal being used to alternately inject accurate currents of opposite polarities into the input resistor of an integrator circuit. The output of the integrator circuit, a series of ramp functions or sawtooth waveforms, is supplied to a differentiating circuit which includes the unknown capacitance as the input element. The output of the differentiator is a voltage which is proportional to the value of the unknown capacitance, this value being filtered and supplied to an appropriate metering and displaying device. Range changing switches can be provided by the square wave source and to simultaneously select circuit elements in the integrator circuit to render the ramp function appropriate for the selected frequency.

In order that the manner in which the foregoing and other objects are attained in accordance with the invention can be understood in detail, particularly advantageous embodiments thereof will be described with reference to the accompanying drawings, which for a part of this specification, and wherein:

FIG. 1 is a schematic diagram of one embodiment of the invention;

FIG. 2 is a schematic diagram of a current injection arrangement usable in the apparatus of FIG. 1;

FIG. 3 is a schematic diagram of a suitable range changing switch circuit usable in the apparatus of FIG. 1; and FIG. 4 is a schematic diagram of an alternate rectifier-filter circuit usable in the apparatus of FIG. 1.

Referring now to FIG. 1, a multifrequency square wave generator 10 is shown with three outputs indicating three different repetition rates of frequencies F1, F2, and F3. These outputs are connected to the fixed contacts of a selector switch indicated generally at 11. The movable contact of switch 11 is connected to the control input terminals of a switch 12 and a switch 13. Switches 12 and 13 are both of a type which can respond to a control signal of predetermined polarity by closing a switchable conductive path. The switchable conductive path of switch 12 is connected to a positive source of voltage 14 and to a junction 15. The switchable path of switch 13 is connected to a negative source of voltage 16 and to junction 15. Sources 14 and 16 are carefully regulated and calibrated sources so that, when the associated switch of either is closed, or rendered conductive, an accurately predetermined voltage appears at junction 15.

Switch 12 is of a type which responds to negative signals to close its conductive path, and can constitute an electromagnetic relay with a suitably polarized diode, or can constitute a solid state switching device of known conventional type. Switch 13 is similar to switch 12 but responds to positive signals.

Junction 15 is connected to one terminal of an input resistor 17, the other terminal of which is connected to the input terminal of a high gain operational amplifier 18 and to one terminal of each of fixed capacitors 19, 20, and 21. The other terminals of each of the capacitors is connected to a fixed contact of a conventional selector switch indicated generally at 22. The movable contact of switch 22 is electrically connected to the output terminal of amplifier 18 and is mechanically coupled to the movable contact of switch 11. The two movable switch contacts and the mechanical coupling constitute the range changing means for the apparatus of FIG. 1.

The output terminal of amplifier 18 is connected to a connector device 25 of any conventional type which is adapted to receive one of the leads or "pigtails" of a capacitor the value of which is to be measured. The other terminal of the capacitor to be measured is connected to a similar connector 26 which is electrically connected to the input terminal of a high gain operational amplifier 27.

The unknown capacitor 24, having a value $C_X$, and amplifier 27 with its associated feedback circuits constitute a differentiator circuit which produces the output voltage to be measured as an indication of the value of $C_X$. The feedback circuits of amplifier 27 are symmetrical, one feedback circuit including the series connection of a conventional semiconductor diode 29 and a precision resistor 30, the series connection being connected between a junction 28 at the output of amplifier 27 and the input junction of the amplifier. A filter capacitor 31 is connected in parallel circuit relationship with resistor 30. The other feedback circuit includes the series connection of a conventional semiconductor diode 32 and a precision resistor 33 with a filter capacitor 34 being connected in parallel circuit relationship with resistor 33. It will be observed that the anode of diode 29 is connected to junction 28 while the cathode of diode 32 is connected to that junction. Thus, when the differentiating circuit conducts current in one direction, one of the feedback circuits will be operative and when the system conducts current in the other direction the other feedback circuit will be operative. The feedback circuits are identical, the values of resistors 30 and 33 and of capacitors 31 and 34 being equal to each other. The output signals are taken from junctions 35 and 36, at the intermediate points of the feedback circuits, the output signals being connected to a measuring device such as a digital voltmeter 40.

As used herein, square wave signals will be understood to be signals which have a rectangular form and in which the ratio of the positive segment duration to the negative segment duration (duty cycle) is equal to 1.

A consideration of the operation of the system will show that the square wave produced by generator 10 operates switches 12 and 13 alternately to inject currents into the integrator including amplifier 18, resistor 17 and the selected one of capacitors 19–21 to produce ramps of alternately opposite polarity but, because of the close voltage control of sources 14 and 16 and the fixed value of resistor 17, of constant slope for any preselected feedback capacitor and frequency combination. These ramps are delivered to the unknown capacitor 24 so that a current $i$ which passes in one direction and then in the other through the capacitor to be measured is equal to $$i = I \frac{C_x}{C_e} \quad (1)$$

where I is the current through junction 15 and $C_e$ is the value of the selected one of capacitors 19–21. When the ramps are differentiated by capacitor 24, amplifier 27 and the feedback circuits associated therewith, the signal which appears at junction 28 is a square wave having a peak-to-peak amplitude E which is $$E = 2RI \frac{C_x}{C_e} \quad (2)$$

where R is equal to the value of one of resistors 30 or 32. After the detection and filtering performed by the feedback circuit diodes and capacitors 31 and 34, a voltage $$V_s = RI \frac{C_x}{C_e} \quad (3)$$

is supplied to meter 40, this voltage being proportional to $C_X$, the value of the unknown capacitor. It will be apparent from Equation 3 that $V_s$ is independent of the frequency and amplitude of the signals provided by generator 10. It will be further apparent that the value of resistors 30 and 33 must be precise, the currents resulting from the voltages supplied by sources 14 and 16 must be precise, and the values of capacitors 19 and 21, represented by $C_e$, must also be precise. As will be recognized by those skilled in the art, providing a constant voltage source presents no problem whatever, nor does the provision of a precise resistor or capacitor.

It is necessary to qualify the above statement with regard to the frequency of generator 10 in that the voltages across the calibration capacitors 19–21 cannot be allowed to reach a prohibitive value. Thus, the frequency selected by switch 11 must vary inversely to the value of the capacity selected by switch 22. It may also be true that, in a particular set of circumstances, the values of the selected one of the calibration capacitors might be low enough to enter a range in which capacitor accuracy is doubtful. In this case, a separate range change can be made by modifying the values of sources 14 and 16 as, for example, by a factor of 2.

For sample values, an apparatus can be constructed in which frequencies F1, F2, and F3 are equal to 100, 10, and 1 kHz., respectively. The values of capacitors 19–21 can then be 1,000, 10,000, 100,000 picofarads with a tolerance of $10^{-4}$. The magnitude of the voltages provided by sources 14 and 16 should also be accurate to within $10^{-4}$. With a frequency of 100 kHz., the internal during which the currents are alternately applied at junction 15 is approximately 5 microseconds and the peak-to-peak amplitude of the voltage appearing at junction 25 is then approximately 5 volts with a conventional high gain amplifier used as amplifier 18.

At junction 28, the peak-to-peak amplitude is that given in Equation 2 above. Since the time constants of RC circuits 30–31 and 33–34 are long relative to the cycle of the signals with the frequencies suggested, a voltage between terminals 35 and 36 is that as given in Equation 3. A suitable value R for resistors 30 and 33 is 1,000 ohms, which gives a value $V_s$ equal to $kC_x$ wherein $k$ is 1 millivolt per picofarad for the smallest capacitor. Suitable measuring ranges for the apparatus using values suggested are, respectively, 1–2,000, 10–20,000, and 100–200,000 picofarads with an accuracy within the desired $5 \times 10^{-4}$.

Referring now to FIG. 2, a circuit is shown therein which can be substituted for a portion of the apparatus shown in FIG. 1. In FIG. 2, the movable contact of switch 11 is shown connected to the base electrodes of a conventional PNP transistor indicated generally at 45 and a conventional PNP transistor indicated generally at 46. The collector electrode of transistor 45 is connected to source 14 and the collector electrode of transistor 46 is connected to source 16. The emitter electrodes of transistors 45 and 46 are both connected to junction 15, which, as in FIG. 1, is connected through resistor 17 to the input of amplifier 18. The remainder of the circuit is not shown in FIG. 2, but is assumed to be substantially the same as that shown in FIG. 1.

In operation, when the signal provided by generator 10 is negative, the base electrode of transistor 45 is driven negative and the transistor is rendered conductive, allowing current to flow from source 14 to amplifier 18, the magnitude of the current being determined by the value of the voltage provided by source 14 and the magnitude $R_0$ of resistor 17. Similarly, when the square wave is positive, transistor 46 is rendered conductive, providing a current of the opposite polarity through resistor 17 to the amplifier. The magnitude, of course, is determined in the same manner.

The specific switching arrangement shown in FIG. 2 is not, of course, the only arrangement which can be used. It is possible, for example, to use a permanent current injector for providing positive current to the junction 15, the current provided being of a magnitude I. A negative current injector having a value $-2I$ can then be connected through a single switch (e.g., transistor 46) which is responsive to the square wave generated to alternately conduct and block current, providing a resulting current through input resistor 17 which is substantially the same as that previously discussed.

FIG. 3 shows an alternative embodiment of the range changing apparatus in which a single fixed capacitor 50 is connected between the input and output terminals of amplifier 18. Switches 12 and 13 conduct current to provide the suitable current to junction 15 as previously described. However, instead of a single input resistor, junction 15 is connected to amplifier 18 through one of three resistors 51, 52 or 53 which are connected between junction 15 and the fixed contacts of a three-position selector switch indicated generally at 54. The movable contact of the selector switch is then connected to the input terminal of amplifier 18.

As a further modification of the apparatus shown in FIG. 1, it will be recognized that the specific rectification and filtering circuit shown in association with the differentiating circuit can be replaced, for example, a four-diode bridge, two corners of which are connected to two terminals of a resistor which is connected in series circuit relationship in a single resistve negatve feedback loop around amplfier 27. The output voltage $V_s$ is then taken from the remaining corners of the bridge with a capacitor being connected between those corners. A circuit meeting this description is shown in FIG. 4 wherein unknown capacitor 24 is the input capacitor for amplifier 27. A feedback resistor 60 is connected between the input and output terminals of amplifier 27, resistor 60 being connected between two corners of a bridge including diodes 61–64. At the junction of diodes 61 and 62, one side of the output is connected, the other side of the output being connected to the junction between diodes 63 and 64. Capacitor 65 is connected across the output circuit for filtering purposes.

What is claimed is:

1. Apparatus for measuring capacitance comprising: means for producing a succession of substantially square waves; an integrator circuit having an input and an output; means responsive to said succession of square waves for providing to said input pulses of current having equal and opposite amplitudes, said integrator circuit being characterized as generating ramp voltages of predtermined slope in response to the current pulses; a high gain amplifier circuit having an input and an output and including resistive negative feedback means connected between the input and output of said amplifier circuit; means for connecting an element the capacitance value of which is to be measured in series between the output of said integrator circuit and the input of said amplifier circuit; said amplifier circuit with said element coupled in series threwith producing an output signal having an amplitude proportional to the capacitance value of said element, means for rectifying the output signal of said amplifier circuit to provide a DC voltage representative of the capacitance of the circuit element; and means for measuring said DC voltage.

2. Apparatus according to claim 1 where said means for producing a succession of square waves includes means for producing said square waves at a plurality of repetition rates.

3. Apparatus according to claim 1 wherein said integrator circuit includes a second high gain amplifier and a plurality of feedback capacitors, each of said capacitors being selectively connectable between the input and output terminals of said second high gain amplifier.

4. Apparatus according to claim 1 wherein said means for producing a succession of square waves produces said waves at a plurality of repetition rates; wherein said means responsive to said succession of square waves includes first switch means for selecting one of said rates; and wherein said integrators circuit includes an amplifier and a plurality of capacitors of different values and second switch means for selectively connecting one of said capacitors in parallel circuit relationship with said amplifier, said first and second switch means having movable selector elements coupled together for selection of a range of measurement.

5. Apparatus according to claim 4 wherein said first and second switch means is connected to increase the repetition rate for each decrease in capacitor value in said integrator circuit when a range of measurement selection is changed.

6. Apparatus according to claim 1 wherein said integrator circuit includes an input resistor and wherein said means responsive to said succession of square waves comprised first and second sources of constant DC voltage of equal magnitudes and opposite polarities; first semiconductor switch means connected between said first source and said input resistor and having a control terminal connected to receive said succession of square waves, said first switch means being responsive to positive half cycles of said square waves to connect said first source to said input resistor; and second semiconductor switch means connected between said second source and said input resistor and having a control terminal connected to receive said succession of square waves, said second switch means being responsive to negative half cycles of said square waves to connect said second source to said input resistor.

7. Capacitance measuring apparatus comprising, means for generating a succession of sawtooth waveforms having predetermined frequency and amplitude and precisely predetermined slope; an amplifier; resistive feedback means connected in nonregenerative feedback relationship with said amplifiers; means for connecting a capacitive device between said amplifier and said means for generating a succession of sawtooth waveforms to form a resistance-capacitance circuit with said amplifier and said resistive feedback means for differentiating said sawtooth waveforms, whereby said amplifier produces a substantially square wave output having apeak amplitude proportional to the capacitance value of the device; and means for measuring said square wave output to provide a measure of capacitance of said capacitive device.

8. A method of measuring capacitance comprising, alternately switching the input of an integrator circuit between precisely determined positive and negative voltage sources to allow the integrator circuit to generate voltage ramps each having a precisely determined slope; connecting a capacitor of unknown capacitance value as the capacitor of a resistance-capacitance differentiating circuit differentiating the ramps to provide a signal having an amplitude which is a function of the capacitance value of the capacitor and measuring the signal amplitude to provide a measure of the capacitance value of the capacitor.

References Cited
UNITED STATES PATENTS 3,325,727   6/1967   Haas _____ 324—60

EDWARD E. KUBASIEWICZ, Primary Examiner